(12) United States Patent
Hohl

(10) Patent No.: US 9,800,067 B2
(45) Date of Patent: Oct. 24, 2017

(54) RAIL CHARGING SYSTEM FOR CHARGING MULTIPLE BATTERIES

(71) Applicant: The Salvajor Company, Kansas City, MO (US)

(72) Inventor: Christopher G. Hohl, Kansas City, MO (US)

(73) Assignee: The Salvajor Company, Kansas City, MO (US)

( * ) Notice: Subject to any disclaimer, the term of this patent is extended or adjusted under 35 U.S.C. 154(b) by 605 days.

(21) Appl. No.: 14/242,582

(22) Filed: Apr. 1, 2014

(65) Prior Publication Data

US 2015/0280472 A1 Oct. 1, 2015

(51) Int. Cl.
*H02J 7/02* (2016.01)
*H02J 7/00* (2006.01)

(52) U.S. Cl.
CPC .......... *H02J 7/0044* (2013.01); *H02J 7/0045* (2013.01)

(58) Field of Classification Search
CPC .................................................... H02J 7/0044
USPC ......................................................... 320/111
See application file for complete search history.

(56) References Cited

U.S. PATENT DOCUMENTS

| | | | |
|---|---|---|---|
| 3,992,225 A | 11/1976 | Sykes | |
| 7,816,887 B2 | 10/2010 | Nam | |
| 8,207,627 B2 | 6/2012 | Aldag | |
| 8,622,756 B2 | 1/2014 | Smed | |
| D709,447 S | 7/2014 | Ibuki et al. | |
| 2004/0196000 A1 | 10/2004 | Wei | |
| 2006/0138998 A1 | 6/2006 | Chen et al. | |
| 2008/0036417 A1 | 2/2008 | Toya et al. | |
| 2008/0067975 A1 | 3/2008 | Law | |
| 2009/0267559 A1 | 10/2009 | Toya et al. | |
| 2009/0267562 A1 | 10/2009 | Guccione et al. | |
| 2011/0237097 A1* | 9/2011 | Aldag | H01R 25/142 439/94 |
| 2012/0299534 A1 | 11/2012 | McBurney | |
| 2013/0132307 A1 | 5/2013 | Phelps et al. | |

* cited by examiner

*Primary Examiner* — Suresh Memula
(74) *Attorney, Agent, or Firm* — Lathrop Gage LLP

(57) ABSTRACT

A rail charger system used to charge multiple battery assemblies which are, in turn, used to charge electronic devices. The multiple battery assemblies slide on and off a rail charger. The rail charger charges multiple batteries at one time. Alternative embodiments of the rail charger system may be used for charging one or two battery assemblies.

20 Claims, 16 Drawing Sheets

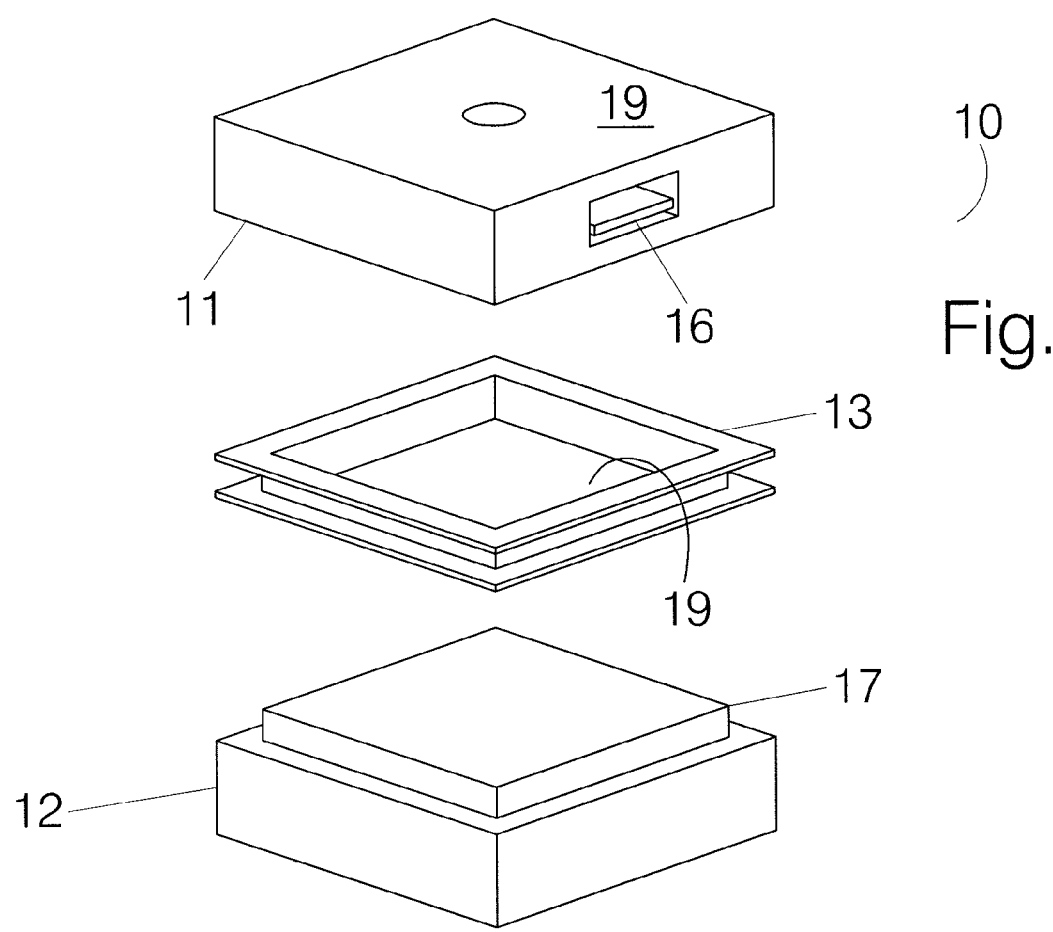

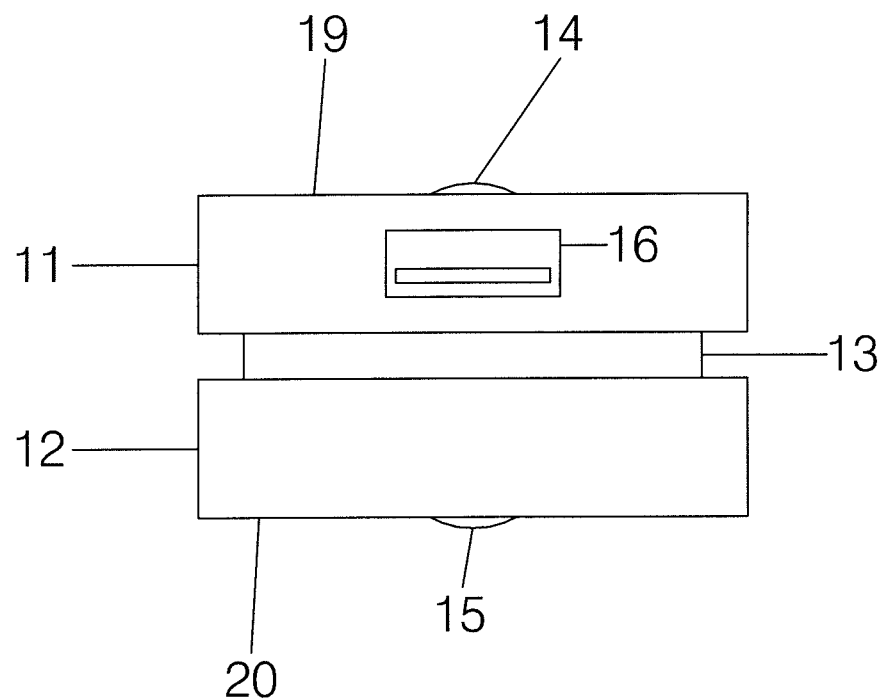

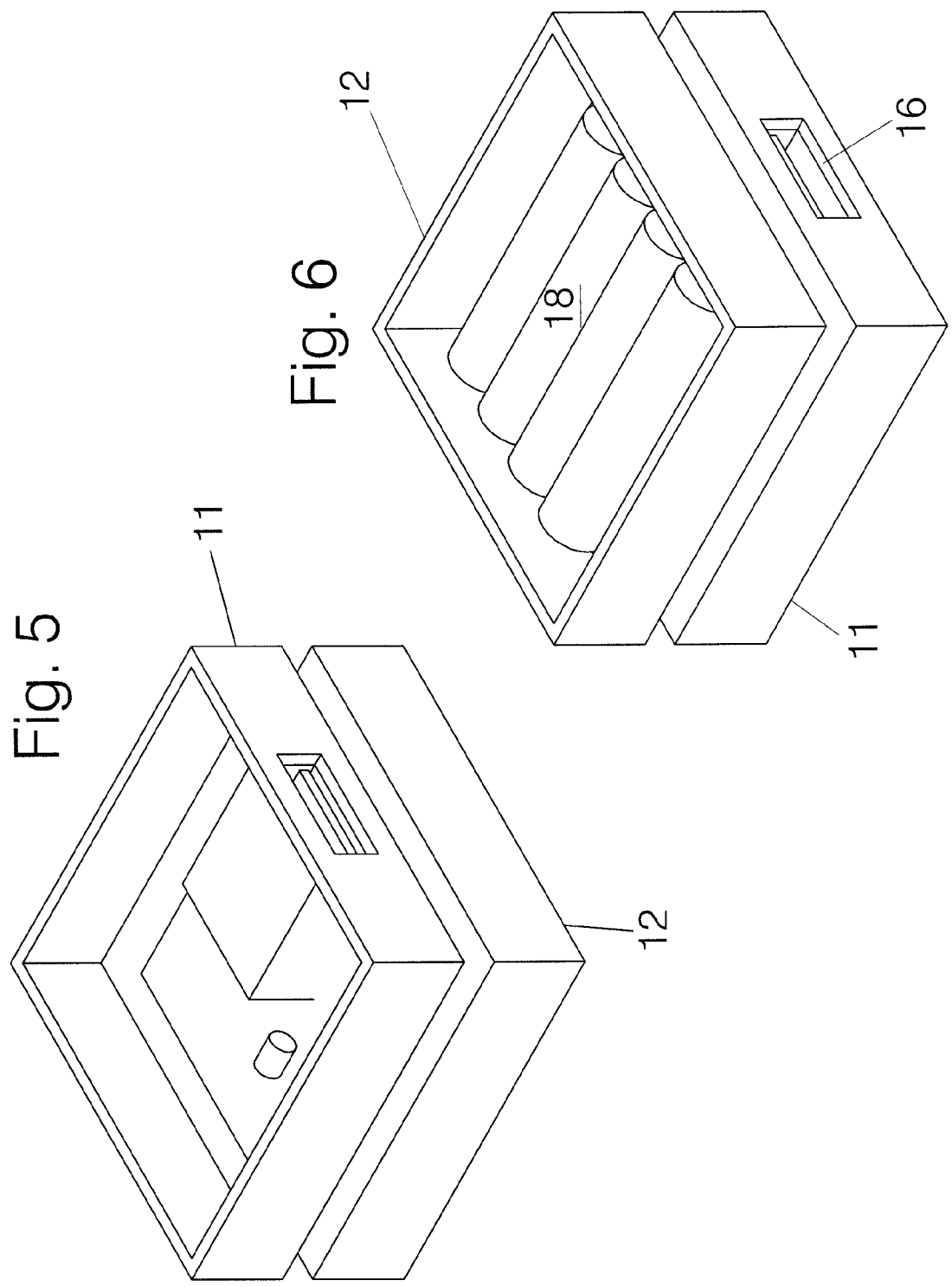

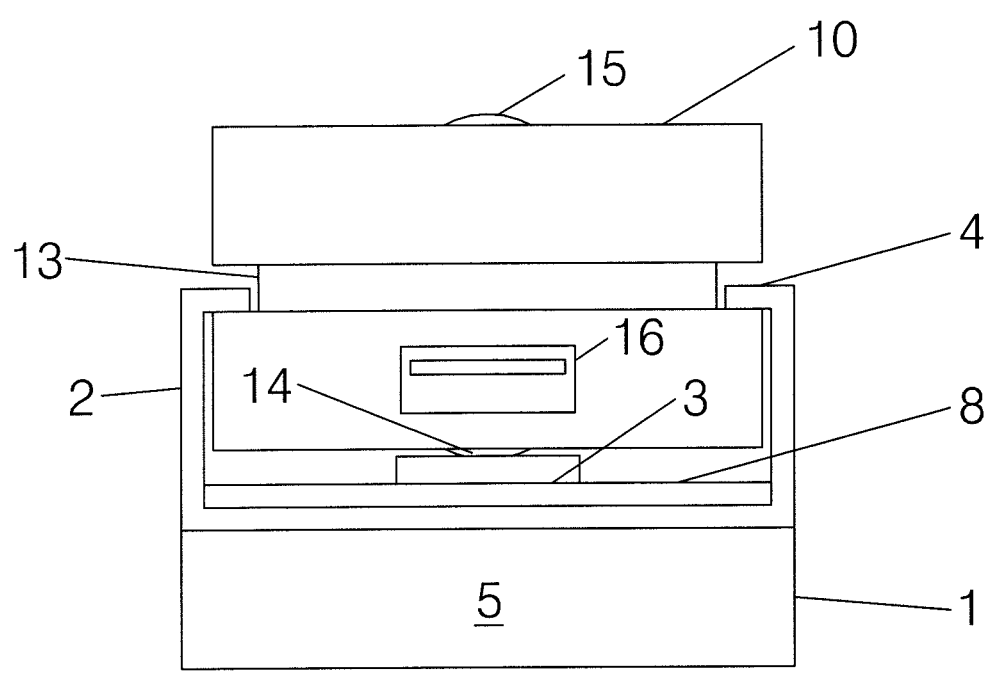

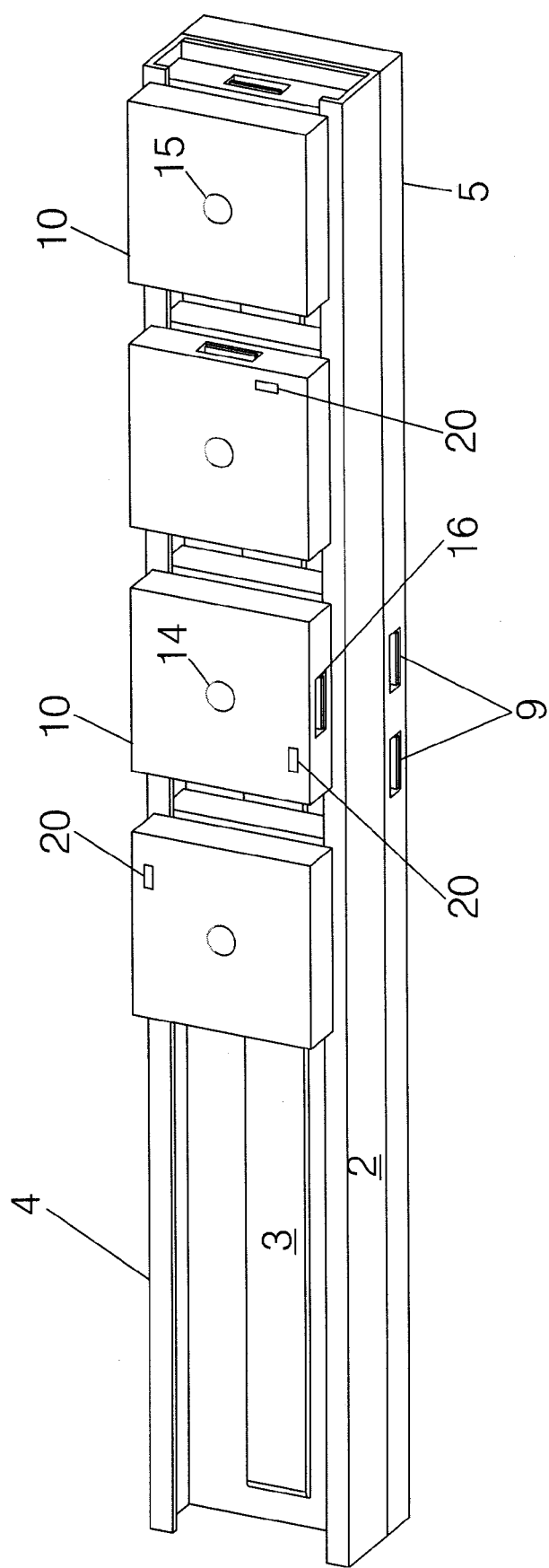

RAIL CHARGING SYSTEM FOR CHARGING MULTIPLE BATTERIES

FIELD OF INVENTION

The field of the invention is battery chargers and battery assemblies for use in charging electronic devices.

BACKGROUND

It is very common for bartenders, waiters, and other employees in restaurants and bars to be asked to charge the smart phones, cell phones, and other electronic devices of guests and patrons. Generally, the phones and electronic devices are charged in the bar area of the establishment, an area known to be wet and messy. Many bars keep various types of cell phone chargers around for this purpose, and it is common to see bar shelves with multiple phones and electronic devices plugged in for charging. In such circumstances, restaurant and bar operators become responsible for hundreds or thousands of dollars' worth of electronic equipment in a wet environment where they are required to safeguard, store and work around the devices.

There is a need to provide a cost effective solution for safely charging multiple battery packs, including USB battery packs for use in charging electronic devices. This is especially the case in restaurants, bars, and other areas in the hospitality industry, as well as in offices, gyms, exercise facilities, and other establishments where patrons or guests stay for more than a brief time and wish to have their electronic devices charged while they are otherwise occupied.

It would be useful and beneficial to have a convenient, unobtrusive charging system in such establishments that would eliminate the need to charge electronic devices in the bar area or in other areas that might be subject to theft, accident, or other mishap. The charging system could also be used in homes, offices, movie theatres, bowling alleys, gyms, exercise facilities, and other locations. When patrons or guests are in such establishments, they could charge their electronic devices while they are otherwise engaged.

SUMMARY OF INVENTION

A low voltage (USB 5 volts) rail charger may be set on a bar or counter top, installed below the bar or counter area counter, attached to a wall, or located in some other convenient area of a restaurant, bar, home, office, gym, exercise facility, or other establishment. The rail charger may be made in various lengths and styles so that it may charge different numbers and types of battery packs. Multiple individual battery packs or chargers slide onto and off the rail. The rail charger is supplied with electric power, which charges the battery packs or battery assemblies while they are on the rail.

An LED or other display on individual battery packs or battery assemblies may be used to signal when the battery pack is charged. When the battery packs are charged, they may be slid off the rail and given to guests or patrons for use in charging their electronic devices while they are in the bar, restaurant, office, or other establishment.

The individual battery packs or assemblies are provided with contacts or plug-in connections for the use of the guest or patron. Typically, this will be a USB connection, which is a very common physical connection for electronic devices. Of course, other types of connections may be installed in the battery packs.

The battery assembly is provided with contacts for receiving electric power to charge the battery or batteries in the pack. This contact is incorporated into the structure of the battery pack so that the battery pack can only be charged while on the charger rail.

The battery pack itself is not useful outside of the establishment or location of its use, as it requires the contact system of the rail in order to receive a charge. The battery pack, so constructed for use with the rail is, thus, not subject to theft by a patron or guest. The battery pack may also be made in a size or shape that would be very inconvenient or difficult to intentionally or inadvertently remove from the establishment where it is used.

The battery pack may also be made in various sizes from small to large depending on the intended use. The voltages in the rail and battery pack are low (approximately 5 volts) and, thus, do not present a shock hazard.

BRIEF DESCRIPTION OF DRAWINGS

FIG. 3 is an exploded view of a battery assembly of the invention.

FIG. 4 is a front view of the battery assembly of FIG. 3.

FIG. 5 is a perspective view of a top housing of the battery assembly of FIG. 3 with an upper surface removed to show the interior of the top housing.

FIG. 6 is an inverted perspective view of a bottom housing of the battery assembly of FIG. 3 with a lower surface removed to show the interior of the bottom housing.

FIG. 7 is a front view of the battery assembly of FIG. 3 installed in the rail charger of FIG. 1.

FIG. 8 is a perspective view of several battery assemblies installed in the rail charger.

DETAILED DESCRIPTION

Figure 1:
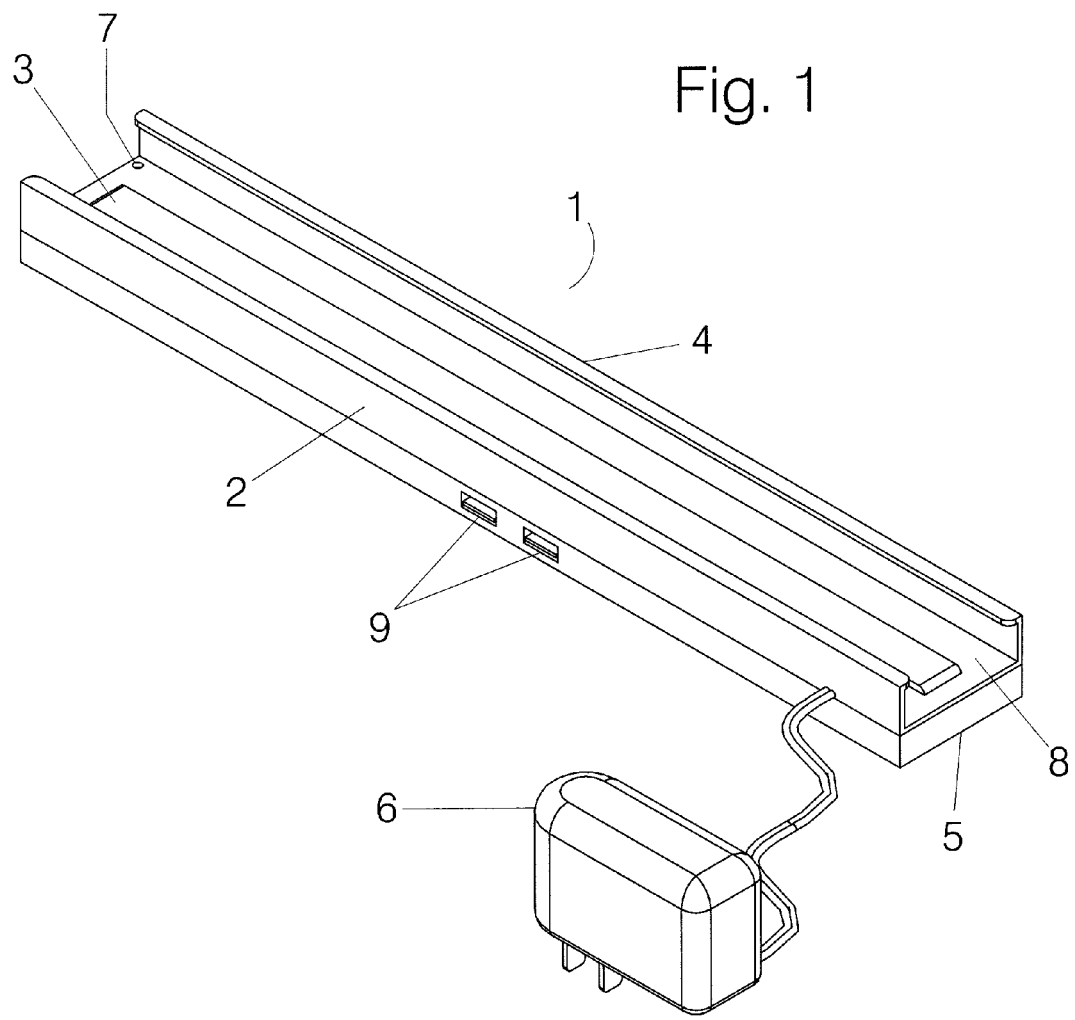
FIG. 1 is a perspective view of a rail charger of the invention.
Figure 2:
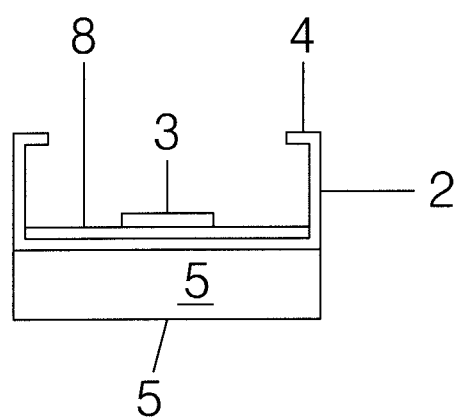
FIG. 2 is a front view of the rail charger of FIG. 1.

As shown in FIGS. 1 and 2, a rail charger 1 is comprised of a bottom 8, upstanding rails 2 extending upward from opposite sides of the bottom 8, a negative electrical contact rail extension 4 extending from each of the rails 2, a positive electrical contact strip 3 on the bottom 8, a compartment 5, USB ports 9, mounting holes 7, and a transformer 6 for supplying power to the rail charger 1.

The negative electrical contact rail extensions 4 are made of a conducting metal material and serve as the negative electrical contact on the rails 2. The positive electrical contact strip 3 is also made of a conductive metal and serves as the positive electrical contact on the rail charger 1. The other portions of the rails 2 need not be made of conductive material, and it helps isolate the positive and negative charges if they are not conductive.

The compartment 5 forms an enclosure for wiring or other connections necessary to conduct electricity from the transformer 6 to the negative contact rail extensions 4, and the positive contact strip 3.

The positive contact strip 3 is also made of a conductive metal. The strip 3 may be leveraged up from the bottom surface 8 of the rail charger 1 via a spring 3a or support device that will raise it above the bottom surface 8 of the rail to assure physical contact with another positive electrical contact.

FIGS. 3, 4, and 5 show a battery assembly 10 comprised of a top housing 11, a bottom housing 12, a negative electrical contact insert 13, positive electrical contacts 14 and 15 (see FIG. 4), and a USB port 16. The top and bottom housings 11, 12 may be secured to a support 17 via the negative contact conductive insert 13.

As shown in FIG. 3, the negative electrical contact insert 13 may comprise a conductive squared channel having a central opening 19 that fits over and is secured to support 17 on bottom housing 12. Of course the battery assembly 10 may be made in different shapes including round, rectangular, oval, or signifying some other object or designation such as a brand logo, animal, sports object, or other desired shape.

As shown in FIGS. 5 and 6, the top housing 11 may house the USB port 16 and its electrical connections (not shown). The bottom housing may house rechargeable batteries 18. The top and bottom housings 11 and 12 may, of course, also house wires and other electrical connections for the battery assembly 10. The housings 11 and 12 may also contain additional multiple USB ports 16 or other types of connecting ports, as well as different types of rechargeable batteries that those show and designated as 18.

As shown in FIG. 4, the positive electrical contacts 14 and 15 extend outward from the upper surface 19 and lower surface 20 of the top and bottom housings 11 and 12, respectively, so as to make physical contact with positive contract strip 3 of the rail charger 1 when the battery assembly 10 is installed in the rails 2 as discussed below and shown in FIG. 7.

In use, the rail charger 1 may be secure to a wall, the top or underside of a counter, or other secure supporting surface via screws, nails or other connectors through the mounting holes 7 (see FIG. 1). Of course, the rail charger 1 may be secured to some other support by ways know in the art, or it may simply be removably placed in a convenient location. The transformer 6 (see FIG. 1) is then plugged into an electrical outlet to supply electricity to the rail charger 1 and the rails 2. The USB ports 9 may be used to charge devices while the batteries are charging. (See FIGS. 1 and 8).

Figure 18:
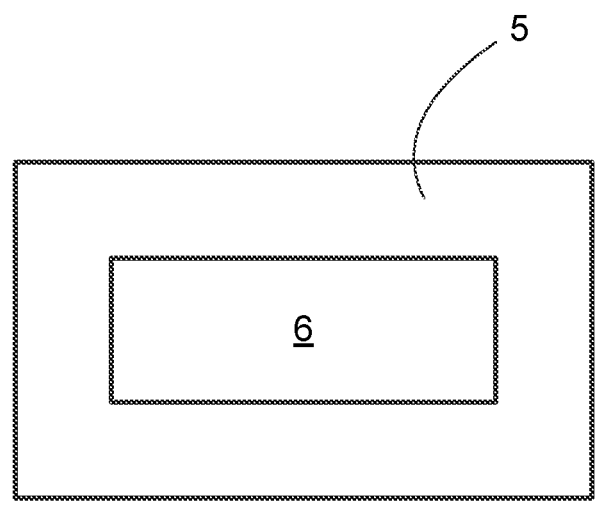
FIG. 18 schematically illustrates some elements of a rail charger according to another embodiment.

In order to increase the capacity of the rail charger 1, two or more rail chargers 1 may be connected side by side or end to end. In the alternative, the rail charger 1 could simply be made longer to accommodate more battery assemblies 10. A single power cord may be used to supply electric energy to all of the rail chargers 1. The transformer 6 may be attached to the power cord (FIG. 1) or mounted to the rail charger 1 itself (FIG. 18).

As shown in FIGS. 7 and 8, the battery assembly 10 slides into the rails 2 such that negative electrical contact extension 4 of the rails 2 makes physical contact with the negative electrical contact insert 13 of the battery assembly 10 and the positive electrical contact strip 3 is in physical contact with the positive electrical contact 14 or the positive electrical contact 15, depending on the orientation of the battery assembly 10 when it is inserted into the rails 2.

When the battery assembly 10 is so inserted into the rails 2, the electrical circuit is completed and the rechargeable batteries 18 in the battery assembly 10 (see FIG. 6) begin charging. The battery assembly 10 is held in the rail 2 due to the fiction between the electrical contacts, namely the spring loaded positive contract strip 3, the negative electrical contact insert 13, the negative electrical rail extensions 4, and the positive electrical contact 14 or 15 (whichever is in physical contact with the strip 3).

As shown in FIG. 8, the battery assemblies 10 may be placed in the rails 2 in any orientation with any side facing forward and with either the top 11 or the bottom 12 inside the rails 2. It is not necessary for a user to position the batteries in any particular way to be inserted in the rails 2, allowing the users to work quickly and not be concerned about making an incorrect connection. The battery assemblies 10 may, of course, be round instead of square. If the battery assemblies 10 were round, additional flexibility and ease of insertion in the rails 2 would be achieved.

As shown schematically in FIG. 8, lights or LEDs 20 may be installed on the top 11 or the bottom 12 housings to signal when the rechargeable batteries 18 are fully charged. When the rechargeable batteries 18 are charged they may be slid off the rails 2 and given to a patron, guest or other possessor of an electronic device to charge that device. A USB connector of the electronic device is connected to the battery assembly 10 to connect the electronic device and the batteries 18 to charge the electronic device. A power switch (not shown) may also be included in the battery assembly 10 to allow the user to turn the battery assembly on or off.

Although a USB port 16 is shown in the drawings (see, e.g., FIGS. 4 and 7), multiple USB ports 16 may be included on the battery assembly 10 and on any of the surfaces of the battery assembly 10. In addition, other connecters may be incorporated in or used with the battery assembly 10. These connections may be of any types compatible with electronic devices. The connections may be on cables, they may fold out of the battery assembly 10, or they may be hinged to a location on the battery assembly 10. If a cable is used, the cable may be made to fit in one of the housings 11 or 12 of the battery assembly 10.

Since the battery assembly 10 is a somewhat bulky shape and cannot be recharged except on the rail charger 1, it is unlikely that a user would accidentally or intentionally carry the battery assembly away from the location or establishment in which it was used. When the user leaves the establishment or has satisfactorily charged his or her electronic device, the battery assembly 10 may again be placed in the rails 2 for recharging.

Figure 9:
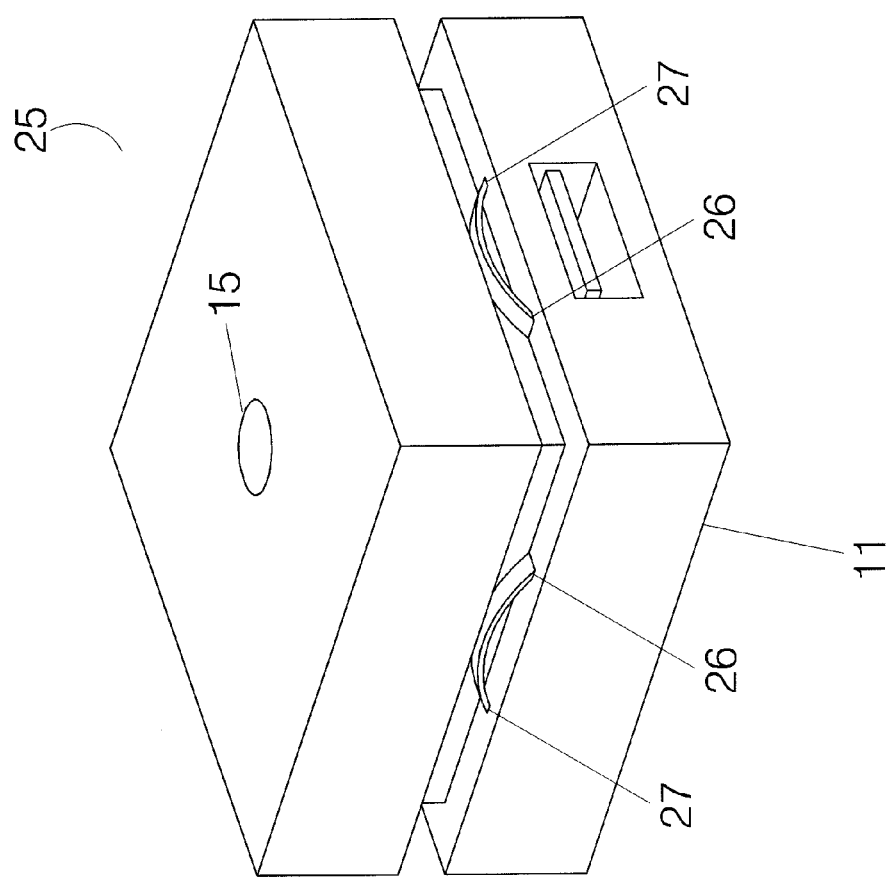
FIG. 9 is a perspective view of an alternative embodiment of a battery assembly having conductive bands as negative electrical contacts for the rail charger.

FIG. 9 shows an alternative battery assembly 25. The battery assembly 25 is similar in all respects to the battery assembly 10, except the negative electrical contact comprises conductive bands 26 extending through or connected to slots 27 in an upper surface of the housing 11. In the battery assembly 25, the negative electrical contact is made when the bands 26 are in contact with the negative electrical rail extensions 4.

Figure 10:
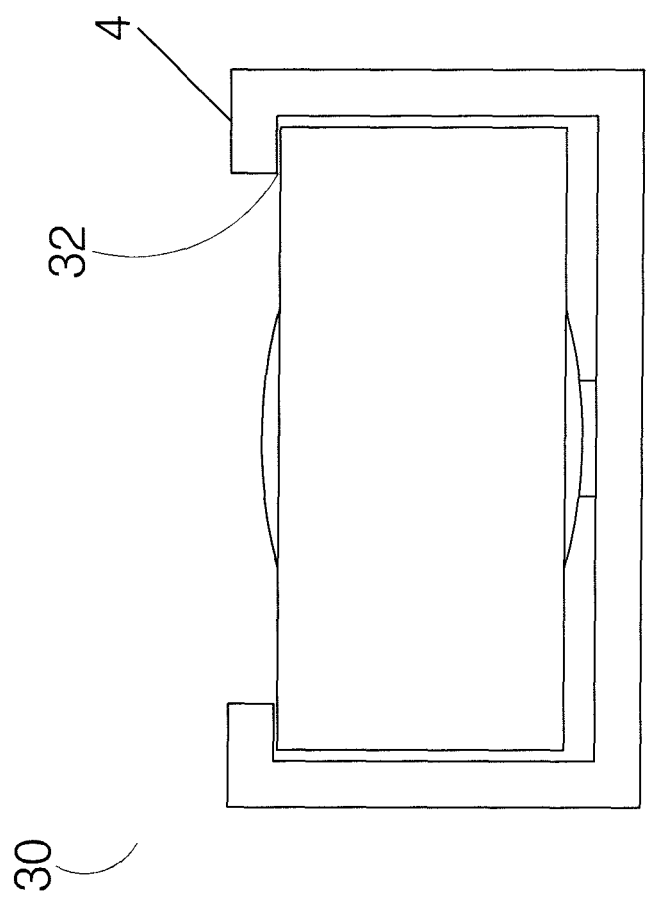
FIG. 10 is a front view of an alternative embodiment of a battery assembly inserted entirely inside the rail charger.

FIG. 10 shows another alternative battery assembly 30 that fits entirely within the rails 2. In this embodiment the rail extension 4 makes physical contact with a conductive strip (not shown) between the rail extension 4 and an edge of the housing 11 or 12 of the battery charger assembly 30. In all other respects, the alternative battery assembly 30 may be constructed and operate similar to the battery assembly 10. The battery assembly 30 is more compact than battery assembly 10 and may be desirable for use is smaller spaces.

Figure 11:
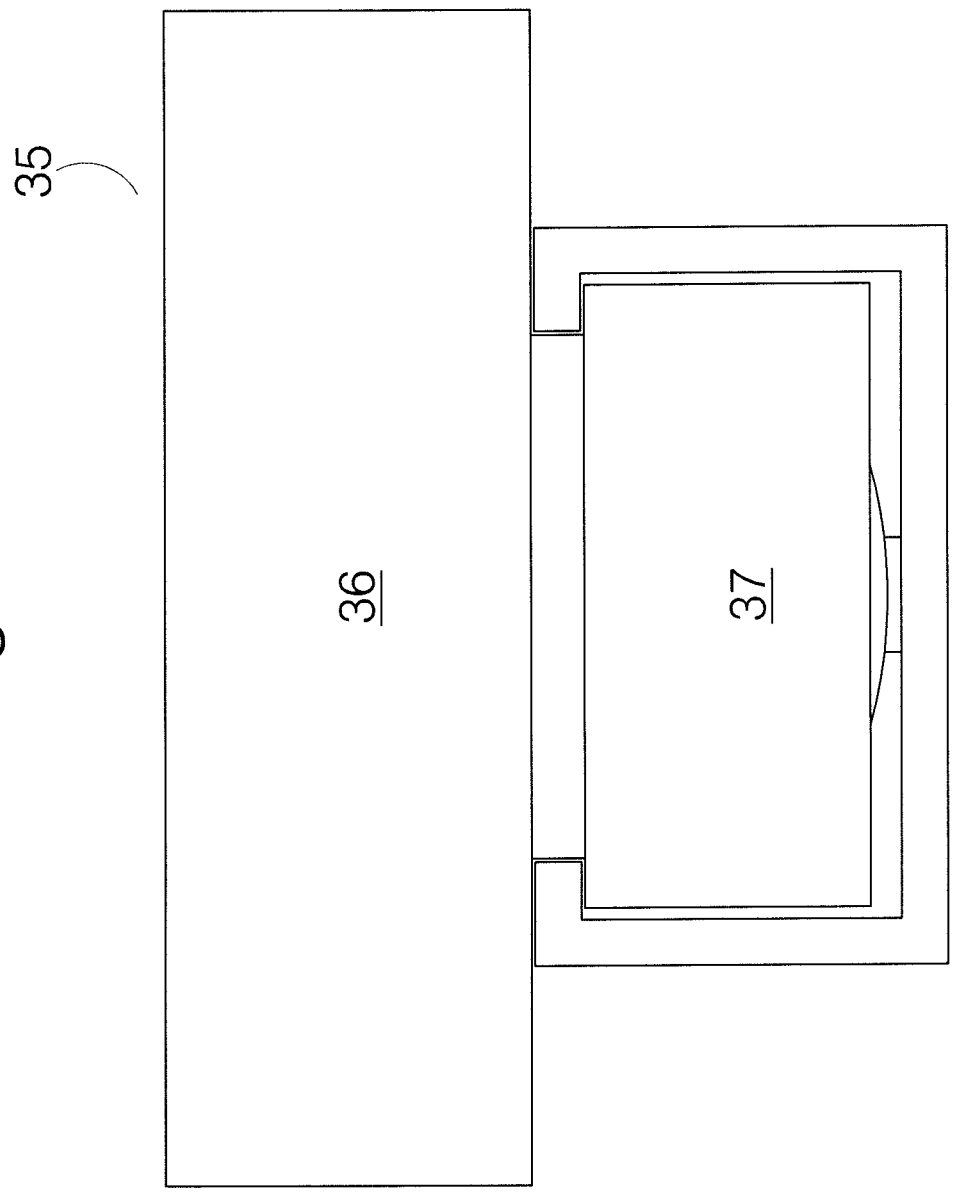
FIG. 11 is a front view of alternative embodiment of a battery assembly inserted in the rail assembly, the battery assembly having two housings of different sizes.

FIG. 11 shows still another alternative battery assembly 35 that has a housing 36 on one part of the battery assembly 35 that is larger than a housing 37 on the other or opposite side of the battery assembly. In all other respects the battery assembly 35 is constructed and operated in a manner similar to the battery assembly 10. The battery assembly 35 is particularly useful in locations or establishments where a user might inadvertently remove the battery assembly 35 from the premises, the larger housing 36 making such removal much more difficult. Moreover, the use of the larger housing 36 allows using larger batteries with larger battery capacity. In the alternative, of course, the battery assembly 35 may be made very small for uses in which a small battery assembly 35 is desired.

Figure 12:
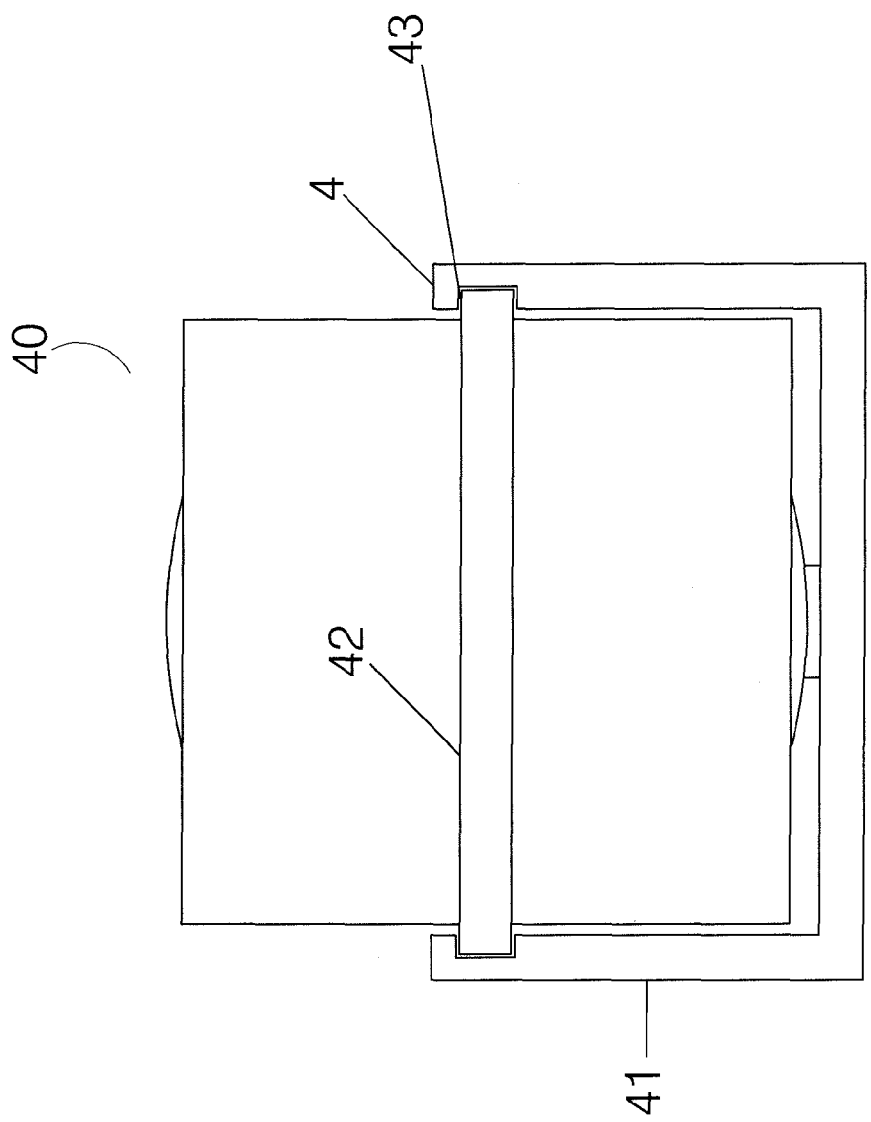
FIG. 12 is a front view of an alternative embodiment of a battery assembly inserted in a rail in which a band around the battery assembly fits into a slot in the rail to make negative electrical contact.

FIG. 12 shows a further alternative battery assembly 40 and rails 41. The battery assembly 40 is constructed similar to the battery assembly 10, except that the negative electric contact is comprised of a band 42 around the battery assembly 40. The band 42 fits into a slot 43 under the rail extensions 4 to make the negative electrical contact.

Figure 13:
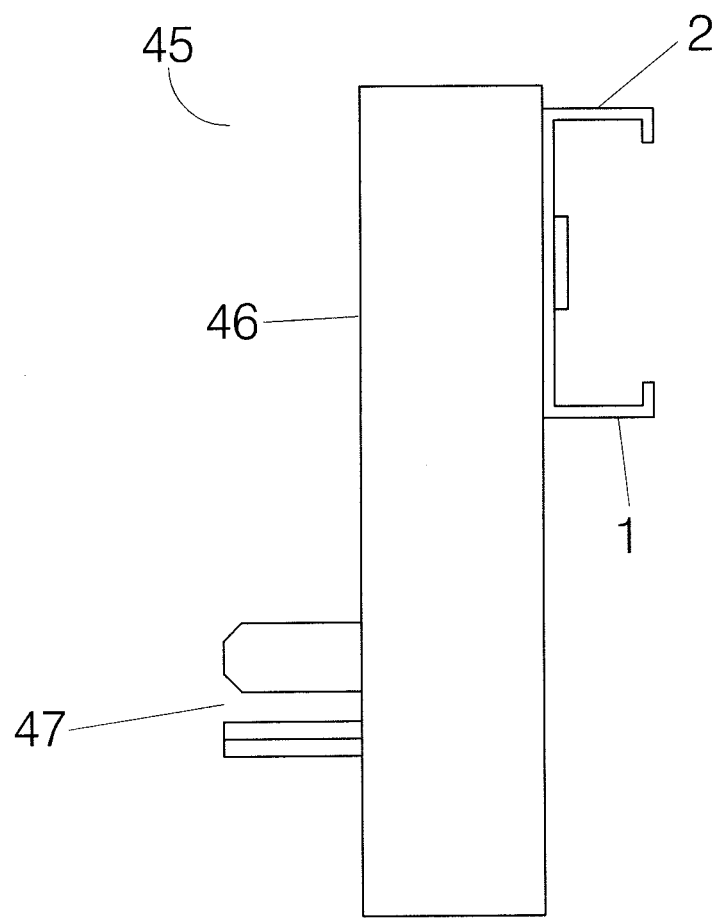
FIG. 13 is a side view of an alternative embodiment of a rail charger assembly having a housing that plugs directly into a wall socket.
Figure 14:
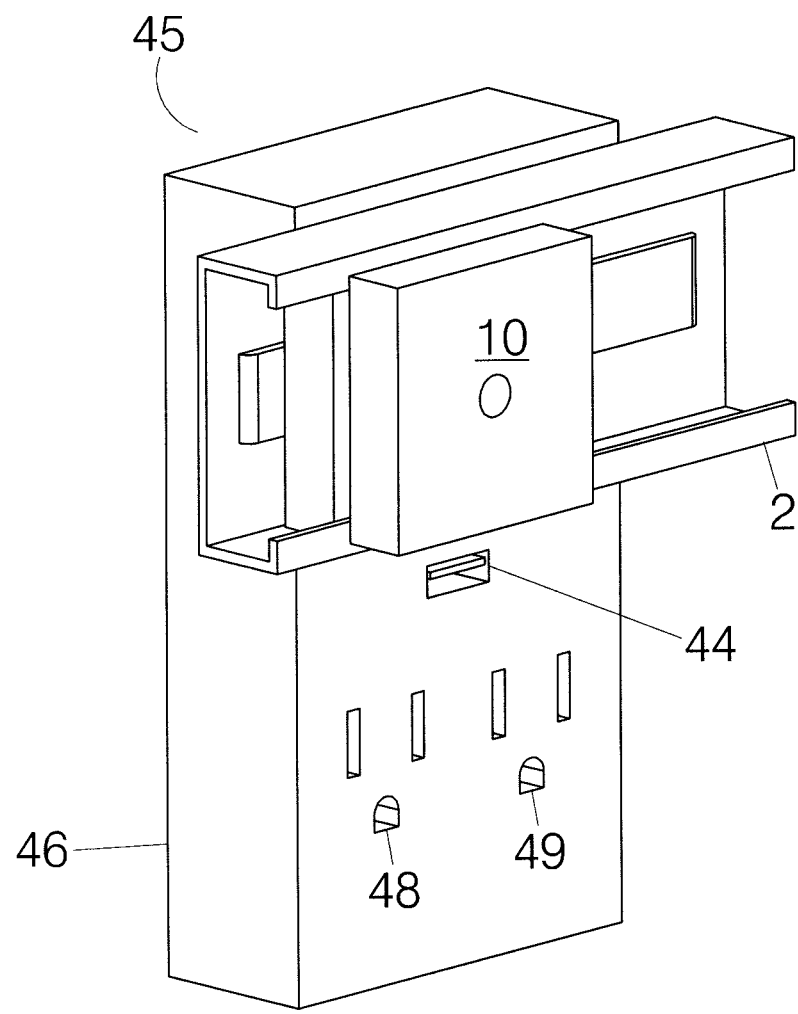
FIG. 14 is a perspective view of the rail charger of FIG. 13 having a battery assembly inserted therein.

FIG. 13 shows a wall mounted rail charger assembly 45 secured to a housing 46 that plugs into a wall outlet via plug 47. The rails 2 are constructed the same as the rails 2 in rail charger 1 in FIGS. 1, 7, and 8. FIG. 14 shows a battery assembly 10 inserted in the rail charger 1 for charging. The battery assembly 10 may be the same as battery assembly 10 shown in FIGS. 2, 3, and 4, or it may be one of the alternative embodiments 25, 30, 35, or 40 shown in FIGS. 9-12. FIG. 14 also shows outlets 48 and 49 on a face of the housing that may be used to charge other electronic devices or used for extension cords.

Figure 15:
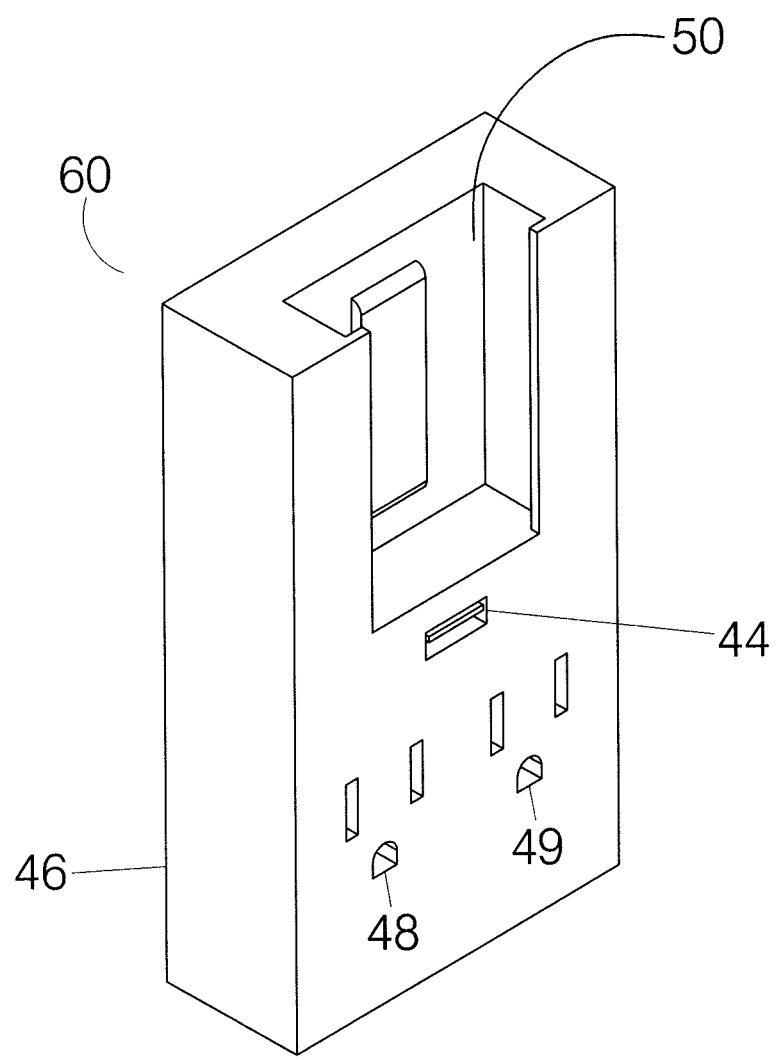
FIG. 15 is a perspective view of an alternative embodiment of a rail charger assembly that plugs directly into to a wall socket, the assembly having a rail incorporated in a housing of the assembly.
Figure 16:
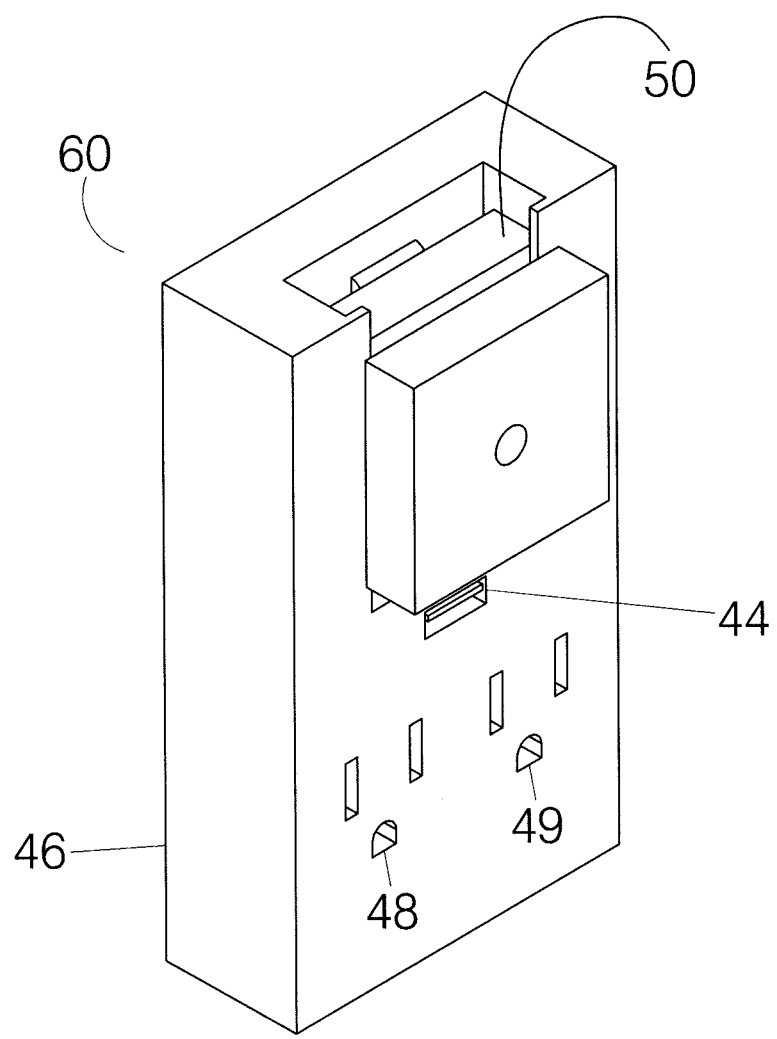
FIG. 16 is a perspective view for the rail charger of FIG. 15 having a battery assembly inserted therein.
Figure 17:
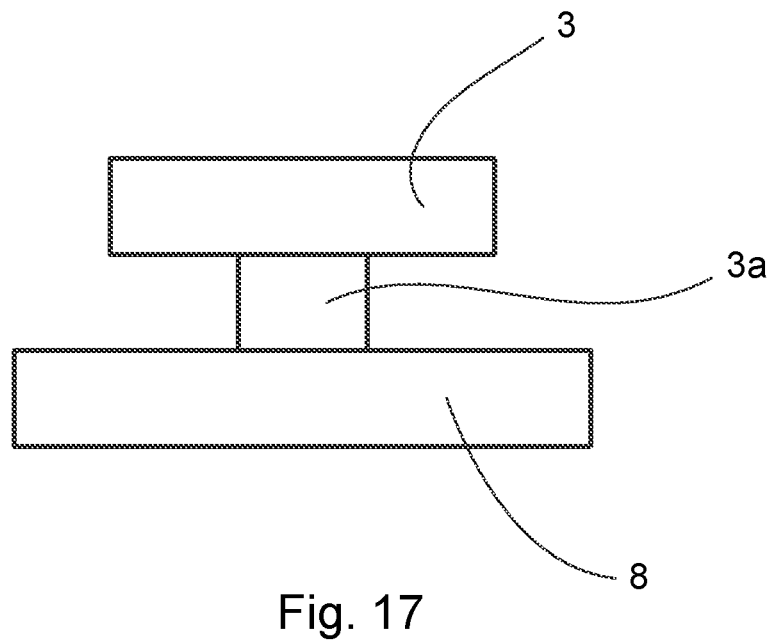
FIG. 17 schematically illustrates some elements of the rail charger of FIG. 1.

FIG. 15 shows and alternative embodiment 60 of the wall mounted rail charger 45 similar to that shown in FIGS. 13 and 14, except the rail charger 50 is incorporated in housing 46. The structure and operation of the rail charger 50 is otherwise similar to the rail charger 1 shown if FIGS. 1, 2, 7, and 8. FIG. 16 shows a battery assembly 10 inserted in the rail charger 50 of the alternative embodiment 60. As shown in FIGS. 14, 15, and 16, a USB port 44 may be included in the wall mounted rail charger assemblies 45 and 60.

The alternative rail charger assemblies 45 and 60 shown in FIGS. 13-16 are particularly well suited to home uses in which the user of an electronic device wants to charge one or more battery assemblies in a quick, handy, and efficient manner for use while traveling or during a day when heavy usage may make it desirable to carry multiple charged battery assemblies.

Certain other enhancements may be made to the battery assembly 10 and its alternative embodiments describe herein. The battery assembly 10 may be made with a display that is or may be activated when the battery assembly 10 is charged. The display may contain instructions for use of the charger, corporate logos of the establishments who use the battery assembly 10, personal logos of individuals who have a home or office version of the battery assembly 10, or advertisements of the establishment that uses the battery assembly 10 or of other entities.

The battery assemblies 10 may be identified via RFID, barcodes, 2D barcodes, or other means of identification so they may be traced wirelessly from location to location or so information may be sent to or from the battery assemblies 10. It is also possible to install an electromagnetic disconnect on the rail charger 1 to disconnect the battery assemblies 10 from the rail charger 1 when they are charged and drop them into a container for distribution to patrons or guests.

I claim:

1. A rail charger system for charging multiple rechargeable battery assemblies, comprising:
   (a) a rail charger having a bottom, upstanding rails on opposite sides of the bottom, and electrical contacts on the bottom and on each of the upstanding rails;
   (b) a first battery assembly slidable between the upstanding rails; the first battery assembly having electrical contacts that come into physical contact with the electrical contacts on the bottom and the upstanding rails of the rail charger when the first battery assembly is slid between the upstanding rails; physical contact between the first battery assembly electrical contacts and the contacts on the bottom and the upstanding rails allowing the first battery assembly to charge; the first battery assembly being separable from the upstanding rails for use in powering an electronic device.

2. The rail charger system of claim 1, further comprising a second battery assembly slidable between the upstanding rails, the second battery assembly having electrical contacts that come into physical contact with the electrical contacts on the bottom and the upstanding rails of the rail charger when the second battery assembly is slid between the upstanding rails; physical contact between the second battery assembly electrical contacts and the contacts on the bottom and the upstanding rails allowing the second battery assembly to charge; the second battery assembly being separable from the upstanding rails for use in powering an electronic device; and wherein the rail charger is sufficiently long to charge the first battery assembly and the second battery assembly at the same time.

3. The rail charger system of claim 1, wherein the electrical contact on the bottom of the rail charger is a strip of conductive material.

4. The rail charger system of claim 3, wherein the strip of conductive materials is leveraged up from the bottom by a spring.

5. The rail charger system of claim 1, wherein a transformer is connected to the rail charger by an electrical cord.

6. The rail charger system of claim 1, wherein a transformer is incorporated into the rail charger.

7. The rail charger system of claim 1, wherein the rail charger system is secured to a supporting surface.

8. The rail charger system of claim 1, wherein the rail charger contains a compartment for containing electrical wires or connections to the electrical contacts.

9. The rail charger system of claim 1, wherein the at least one battery assembly includes a USB port.

10. The rail charger system of claim 1, wherein the at least one battery assembly has a housing on one part thereof that that is larger than a housing on another part thereof.

11. The rail charger system of claim 1, wherein the at least one battery assembly has a connection for an electronic device that is at least one of a hinge connection, a fold out connection, and a cord connection.

12. The rail charger system of claim 1, wherein the at least one battery assembly has electrical contacts on opposite sides thereof, either of which make physical contact with the electrical contact on the bottom of the rail charger.

13. The rail charger system of claim 1, wherein the at least one battery assembly has an electrical contact that surrounds the battery assembly so as to make physical contact with the electrical contacts on the upstanding walls of the rail charger.

14. The rail charger system of claim 1, wherein the at least one battery assembly has an electrical contact comprising sides of a conductive channel that surrounds the battery assembly and into which extensions of the upstanding rails of the rail charger extend to make an electrical connection.

15. The rail charger system of claim 14, wherein the electric contact surrounding the battery assembly comprises conductive bands extending up into the channel so as to make electrical contact with the extensions of the upstanding rails.

16. The rail charger system of claim 1, wherein the at least one battery assembly has an electrical contact comprising a conductive band that slides into slots in the upstanding rails of the battery charger.

17. The rail charger system of claim 1, wherein multiple battery assemblies slide on the rail charger.

18. The rail charger system of claim 1, wherein the at least one battery assembly has an LED showing when the battery assembly is charged.

19. The rail charger system of claim 1, wherein the at least one battery assembly has an on-off switch.

20. The rail charger system of claim 1, wherein the at least one battery assembly has a display for at least one of instructions, advertisements, or other information.

* * * * *